(12) United States Patent
Kuwayama et al.

(10) Patent No.: US 10,962,131 B2
(45) Date of Patent: Mar. 30, 2021

(54) FILL LIMIT VENT VALVE

(71) Applicant: TOYODA GOSEI CO., LTD., Kiyosu (JP)

(72) Inventors: Kenta Kuwayama, Troy, MI (US); Caleb Bauer, Troy, MI (US); Steven Yurgalonis, Troy, MI (US); Pierre Grypinich, Troy, MI (US)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/552,061

(22) Filed: Aug. 27, 2019

(65) Prior Publication Data

US 2021/0062928 A1 Mar. 4, 2021

(51) Int. Cl.
*F16K 24/04* (2006.01)
*B60K 15/035* (2006.01)

(52) U.S. Cl.
CPC ...... *F16K 24/044* (2013.01); *B60K 15/03504* (2013.01); *B60K 15/03519* (2013.01); *B60K 2015/03576* (2013.01)

(58) Field of Classification Search
CPC ............ F16K 24/044; B60K 15/03519; B60K 15/03504; B60K 2015/03576
USPC ...... 123/514, 516, 518, 519; 137/38, 39, 43, 137/202
See application file for complete search history.

(56) References Cited

U.S. PATENT DOCUMENTS

| 7,147,017 | B2 | 12/2006 | Leonhardt | |
| 2008/0092962 | A1* | 4/2008 | Theissler | B60K 15/03519 137/587 |
| 2010/0224262 | A1* | 9/2010 | Arnalsteen | B60K 15/03519 137/43 |

* cited by examiner

*Primary Examiner* — Phutthiwat Wongwian
*Assistant Examiner* — Diem T Tran
(74) *Attorney, Agent, or Firm* — Posz Law Group, PLC

(57) ABSTRACT

A fill limit vent valve includes a float valve, a housing, and a lid. The housing includes a cylindrical outer wall and a tubular portion. The outer wall has a central axis. The tubular portion accommodates the float valve. The lid is placed on the upper end of the tubular portion and has a communicating opening. The housing includes a fuel passage that has an inlet and a discharge port. The discharge port is connected to the communicating opening. A section of the tubular portion that faces the fuel passage is constituted by a curved surface. A guide wall that has at least one guide surface is provided between the fuel passage and the inlet. A straight line on the curved surface that is parallel with the central axis is defined as a generatrix. The guide surface extends along the curved surface while being inclined relative to the generatrix.

5 Claims, 6 Drawing Sheets

FILL LIMIT VENT VALVE

BACKGROUND

1. Field

The present disclosure relates to a fill limit vent valve that shuts off the flow of fuel vapor to the outside of a fuel tank when detecting that the fuel tank is filled up with liquid fuel.

2. Description of Related Art

The fuel tank of a vehicle is equipped with a fill limit vent valve that closes the communicating opening when detecting that the fuel tank is filled up, thereby shutting off flow of fuel vapor to the outside of the fuel tank.

The fill limit vent valve includes a float valve, a housing, and a lid. The outer shell of the housing is constituted by a cylindrical outer wall having a vertically extending central axis. The housing includes a tubular portion. The tubular portion accommodates the float valve such that the float valve is movable vertically. The lid is placed on the upper end of the housing. The lid has a communicating opening that connects the space inside the tubular portion and the space above the lid.

The housing includes a fuel passage between the tubular portion and the outer wall. A section of the tubular portion that faces the fuel passage is constituted by a curved surface that bulges toward the fuel passage. The fuel passage includes an inlet for liquid fuel and fuel vapor and a discharge port connected to the communicating opening. The discharge port is located above the inlet.

In the above-described fill limit vent valve, the float valve moves upward as the level of the liquid fuel flowing into the tubular portion via the fuel passage rises, and closes the communicating opening, so that the flow of fuel vapor to the outside of the housing is shut off.

The above-described fill limit vent valve may cause liquid fuel to flow out from the fuel tank together with fuel vapor via the communicating opening.

To address this problem, for example, U.S. Pat. No. 7,147,017 discloses a fill limit vent valve shown in FIG. 11. The fill limit vent valve includes a housing 81 that has fuel passages 83 for liquid fuel and fuel vapor in a fuel tank between a tubular portion 82 and a cylindrical outer wall 87. A part of the tubular portion 82 that faces the fuel passages 83 is constituted by a curved surface 82a that bulges toward the fuel passages 83. Each fuel passages 83 has an inlet 84 for liquid fuel and fuel vapor at the lower end. The fuel passage 83 also has a discharge port 85 at the upper end. The discharge port 85 is connected to the communicating opening. An upper wall 86 is formed in a section above the discharge ports 85 of the fuel passages 83. The upper wall 86 changes the direction of flow of liquid fuel and fuel vapor rising in the fuel passages 83 to circumferential directions of the outer wall 87 as indicated by arrows G. When a straight line on the curved surface 82a that is parallel with the central axis (not shown) of the outer wall 87 is defined as a generatrix GL, the upper wall 86 is orthogonal to the generatrix GL.

With the above-described prior art fill limit vent valve 80, fuel vapor in which liquid fuel is mixed strikes the upper wall 86, so that the flow direction is changed from the vertical direction to a direction orthogonal to the generatrix GL. As compared to a case in which the flow direction is not changed, the resistance to flow through the fuel passages 83 is increased. The liquid fuel is thus easily separated from the fuel vapor. This restricts outflow of liquid fuel from the fuel tank together with fuel vapor via the communicating opening.

However, although the above-described prior art fill limit vent valve 80 is capable of limiting outflow of liquid fuel, the upper wall 86 acts as resistance to flow of fuel vapor through the fuel passages 83. This increases the pressure of the fuel vapor in the fuel tank, hindering entry of liquid fuel into the fuel tank.

SUMMARY

It is an objective of the present disclosure to provide a fill limit vent valve capable of restricting both outflow of liquid fuel and pressure increase of fuel vapor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fill limit vent valve that includes a float valve, a housing, and a lid is provided. The housing includes a cylindrical outer wall and a tubular portion. The outer wall constitutes an outer shell of the housing and has a vertically extending central axis. The tubular portion accommodates the float valve such that the float valve is movable vertically along the central axis. The lid is placed on an upper end of the tubular portion. The lid has a communicating opening that connects a space inside the tubular portion and a space above the lid. The housing includes a fuel passage between the tubular portion and the outer wall. At least a part of a section of the tubular portion that faces the fuel passage is constituted by a curved surface that bulges toward the fuel passage. The fuel passage includes an inlet for liquid fuel and fuel vapor in a fuel tank and a discharge port connected to the communicating opening. The discharge port is located above the inlet. The fill limit vent valve is configured such that, as a level of liquid fuel that has flowed into the tubular portion through the fuel passage rises, the float valve moves upward and closes the communicating opening to shut off flow of fuel vapor to an outside of the housing. A guide wall that has at least one guide surface is provided between the inlet and the discharge port of the fuel passage. The guide surface is configured to change a direction of flow of the liquid fuel and the fuel vapor. A straight line on the curved surface that is parallel with the central axis is defined as a generatrix. The guide surface extends along the curved surface while being inclined relative to the generatrix.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A fill limit vent valve 20 according to an embodiment will now be described.

A vehicle is equipped with a fuel tank 11 that stores liquid fuel used in the engine. An evaporative emission control system, which is referred to as an evap circuit, is provided in the vicinity of the fuel tank 11. The evap circuit guides fuel vapor inside the fuel tank 11 to a canister 10 outside the fuel tank 11 and temporarily stores the fuel vapor by adsorbing it on activated carbon and the like, thereby limiting increase in the internal pressure of the fuel tank 11 due to increase in the vapor pressure. The canister 10 is coupled to the intake passage of the engine. The canister 10 releases fuel vapor from the activated carbon using the intake negative pressure of the engine and mixes the fuel vapor into the air-fuel mixture, thereby allowing the adsorbed fuel vapor to be used as fuel.

The fuel tank 11 has a supply port for liquid fuel in the wall. Liquid fuel is supplied to the interior of the fuel tank 11 through the supply port.

Figure 1:
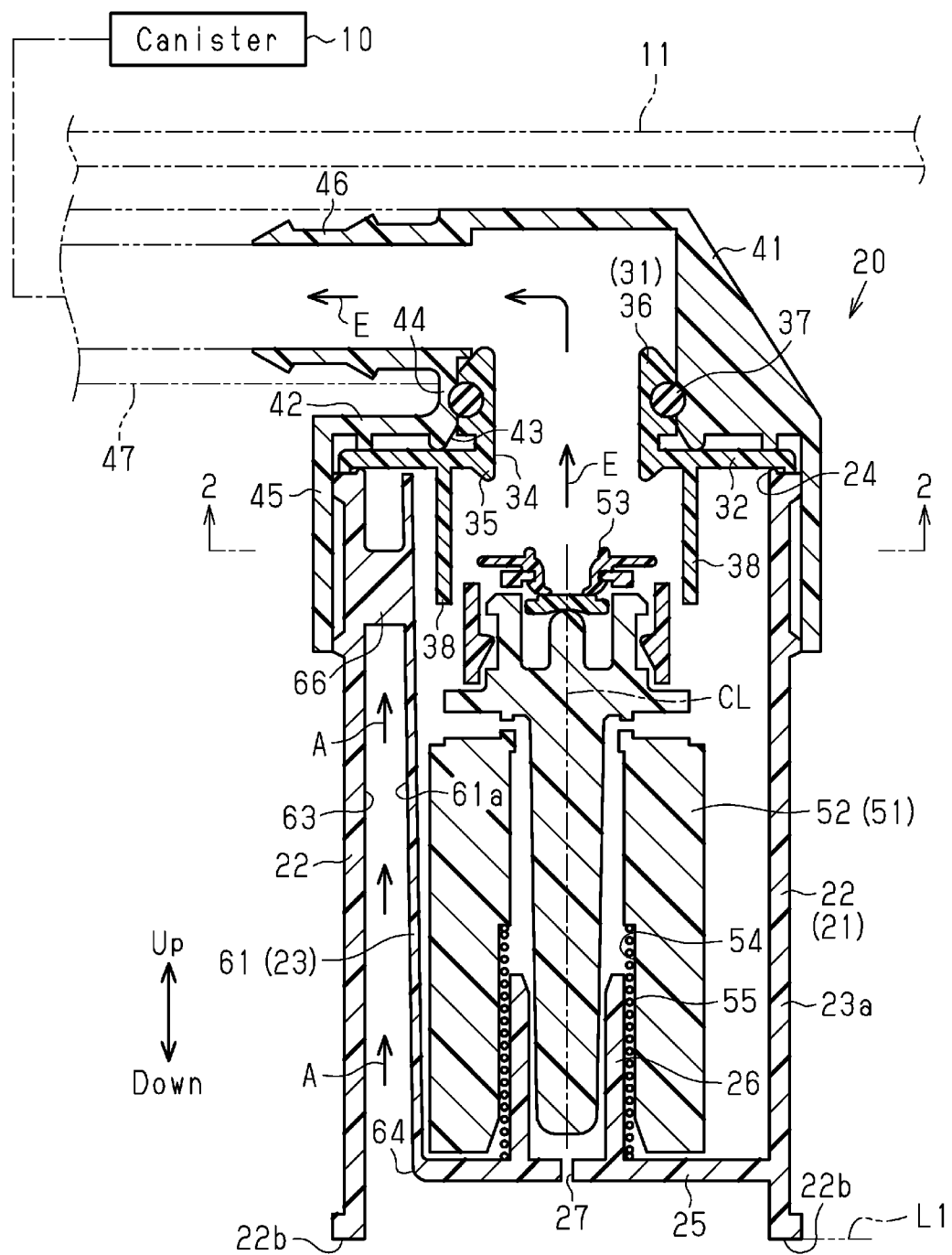
FIG. 1 is a cross-sectional side view of a fill limit vent valve according to an embodiment.

As shown in FIG. 1, the fill limit vent valve 20 is arranged in the fuel tank 11. The fill limit vent valve 20 is attached, for example, to the ceiling wall of the fuel tank 11. The fill limit vent valve 20 includes a housing 21, a lid 31, a connecting portion 41, a float valve 51, and a spring 55. Next, each component will be described.

<Housing 21>

Figure 2:
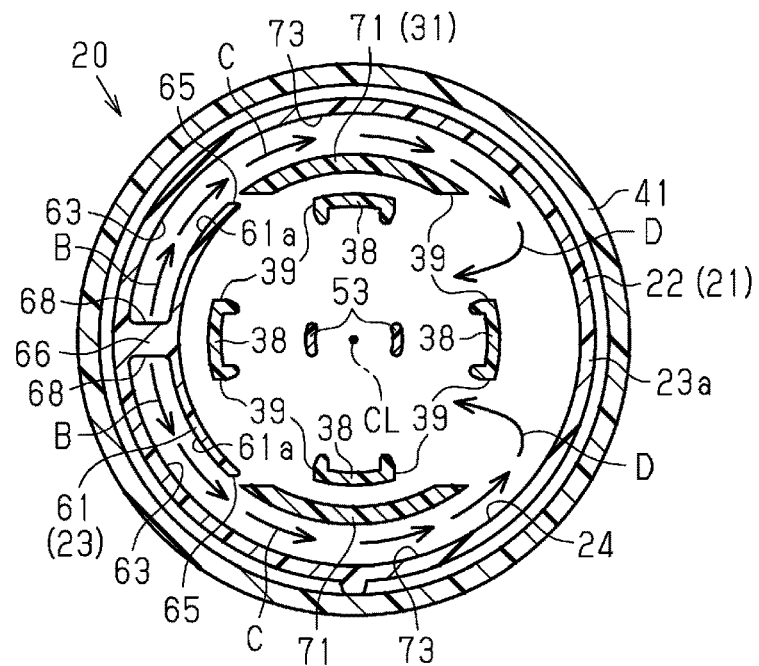
FIG. 2 is a cross-sectional view taken along line 2-2 of FIG. 1, illustrating the fill limit vent valve.

As shown in FIGS. 1 and 2, the housing 21 includes an outer shell that is constituted by an outer wall 22 having a vertically extending central axis CL. The height of a lower end face 22b of the outer wall 22 is set to substantially the same height as the level L1 of liquid fuel when the fuel tank 11 is full.

Figure 5:
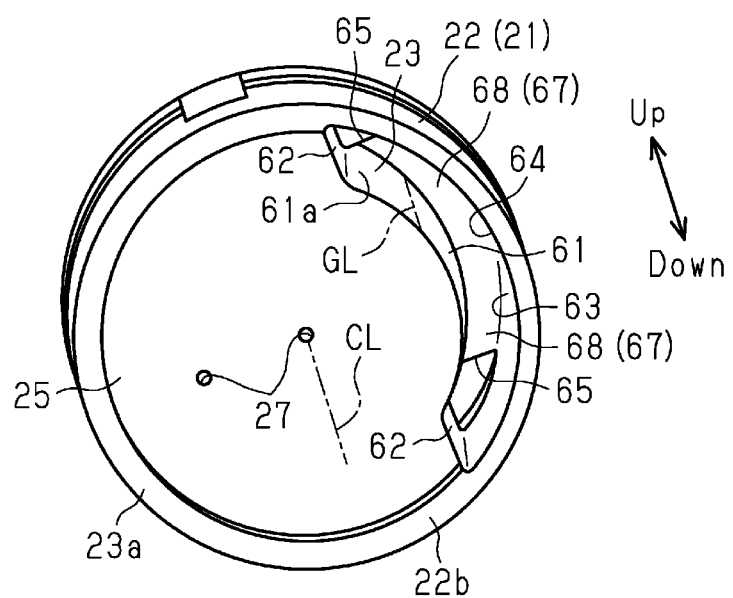
FIG. 5 is a perspective view from obliquely below showing the housing of the embodiment.
Figure 6:
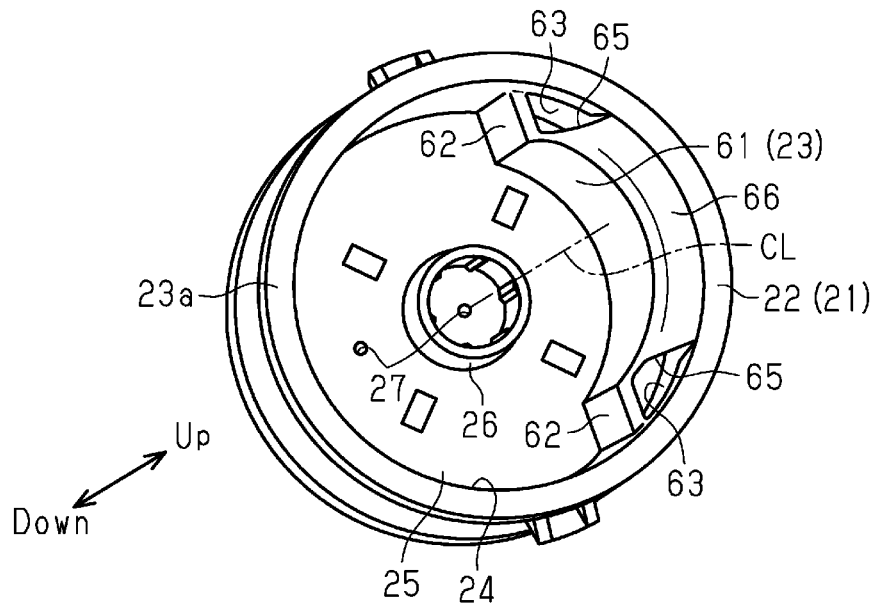
FIG. 6 is a perspective view from obliquely above showing the housing of the embodiment.

The housing 21 includes a tubular portion 23 extending vertically along the central axis CL. The housing 21 has a substantially cylindrical shape by combining the tubular portion 23 and a first fuel passage 63, which will be discussed below. As shown in FIGS. 1, 5, and 6, a part 23a of the tubular portion 23 is constituted by a part of the outer wall 22 in the circumferential direction. The remainder of the tubular portion 23 is constituted by an inner wall 61 and a pair of connecting walls 62. The inner wall 61 is separated inward from the outer wall 22 in the radial direction and is curved to bulge outward in the radial direction.

The tubular portion 23 has a bottom wall 25 at the lower end. The bottom wall 25 is located slightly above the lower end face 22b of the outer wall 22. The upper end of the inner wall 61 is located at substantially the same height as the upper end of the outer wall 22. The lower end of the inner wall 61 is connected to the bottom wall 25. Whereas the inner wall 61 is curved, the connecting walls 62 are formed to be flat. The connecting walls 62 connect the opposite sides in the circumferential direction of the outer wall 22 to the outer wall 22. Like the inner wall 61, the lower end of each connecting wall 62 is connected to the bottom wall 25. In contrast, the upper end of each connecting wall 62 is at a position below the upper end of the inner wall 61. The connecting walls 62 are not formed at the upper end of the inner wall 61 at the opposite sides in the circumferential direction of the outer wall 22.

The space in the housing 21 that is surrounded by the outer wall 22, the inner wall 61, and the connecting walls 62 is adjacent to and outward of the tubular portion 23. The space is open at the lower end and also open in an upper part of the inner wall 61 at the opposite sides in the circumferential direction of the outer wall 22. The space constitutes the first fuel passage 63. A part of the first fuel passage 63 that is open at the lower end constitutes an inlet 64. In an upper part of the first fuel passage 63, open parts at the opposite sides in the circumferential direction of the outer wall 22 constitute a pair of discharge ports 65. The discharge ports 65 are located above the inlet 64.

The outer surface of the inner wall 61 in the tubular portion 23 faces the first fuel passage 63. The outer surface is constituted by a curved surface 61a, which bulges toward the first fuel passage 63.

As shown in FIGS. 1 and 6, a cylindrical guide tube 26 having an open upper end protrudes upward from the central portion of the bottom wall 25. The bottom wall 25 has a communicating hole 27 that vertically connects the inner space of the tubular portion 23 and the space below the bottom wall 25 to each other. The communicating hole 27 has a function of discharging liquid fuel in the tubular portion 23.

The upper ends of the tubular portion 23 and the first fuel passage 63 are open, and these open portions constitute an upper opening 24 of the housing 21.

<Lid 31>

Figure 8:
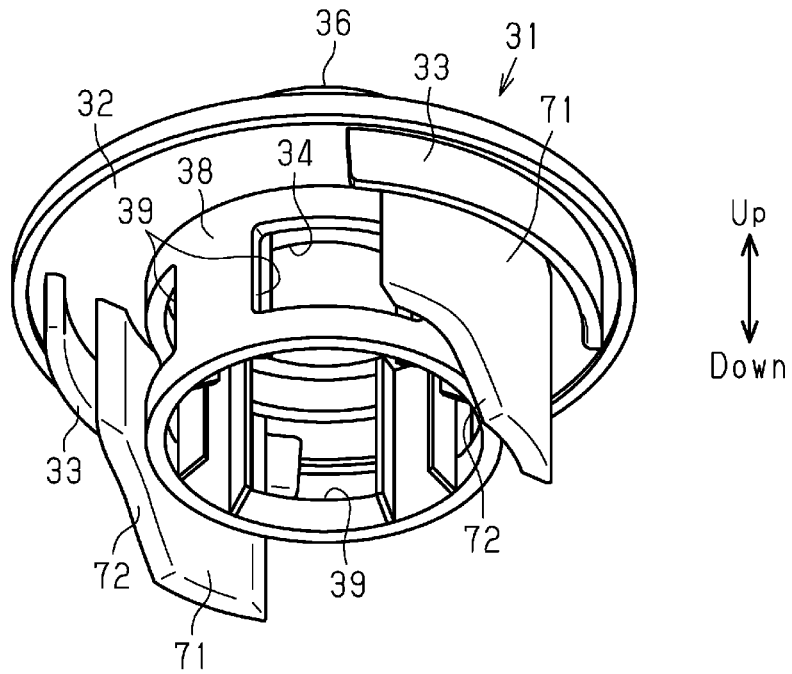
FIG. 8 is a perspective view from obliquely below showing the lid of the embodiment.
Figure 9:
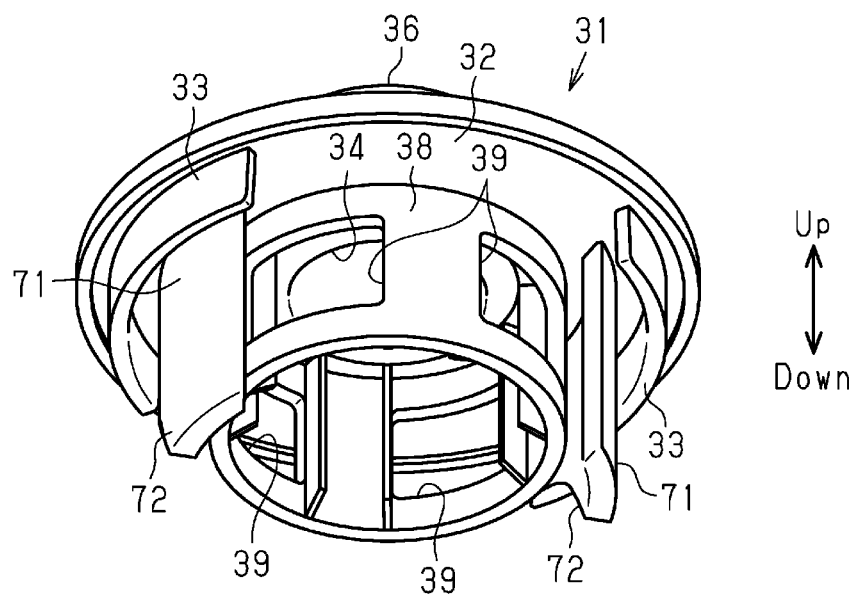
FIG. 9 is a perspective view from obliquely below as viewed in a direction different from that in FIG. 8, showing the lid of the embodiment.

As shown in FIGS. 1, 8, and 9, the lid 31 includes a disk-shaped horizontal wall 32. The horizontal wall 32 has engaging protrusions 33 at the periphery of the lower surface. The engaging protrusions 33 are spaced apart from each other in the circumferential direction. The lid 31 is attached to the housing 21 while being placed on the upper end of the tubular portion 23 with the engaging protrusions 33 engaged, from above, with engagement portions (not shown) provided at the upper end of the housing 21. In a state in which the lid 31 attached to the housing 21, the horizontal wall 32 closes the upper opening 24 from above.

The lid 31 has a communicating opening 34 at the central portion of the horizontal wall 32. The communicating opening 34 vertically connects the inner space of the housing 21, to which the lid 31 is attached, and the space above the lid 31. An annular valve seat 35 is formed on the lower surface of the horizontal wall 32 at the periphery of the communicating opening 34.

Figure 3:
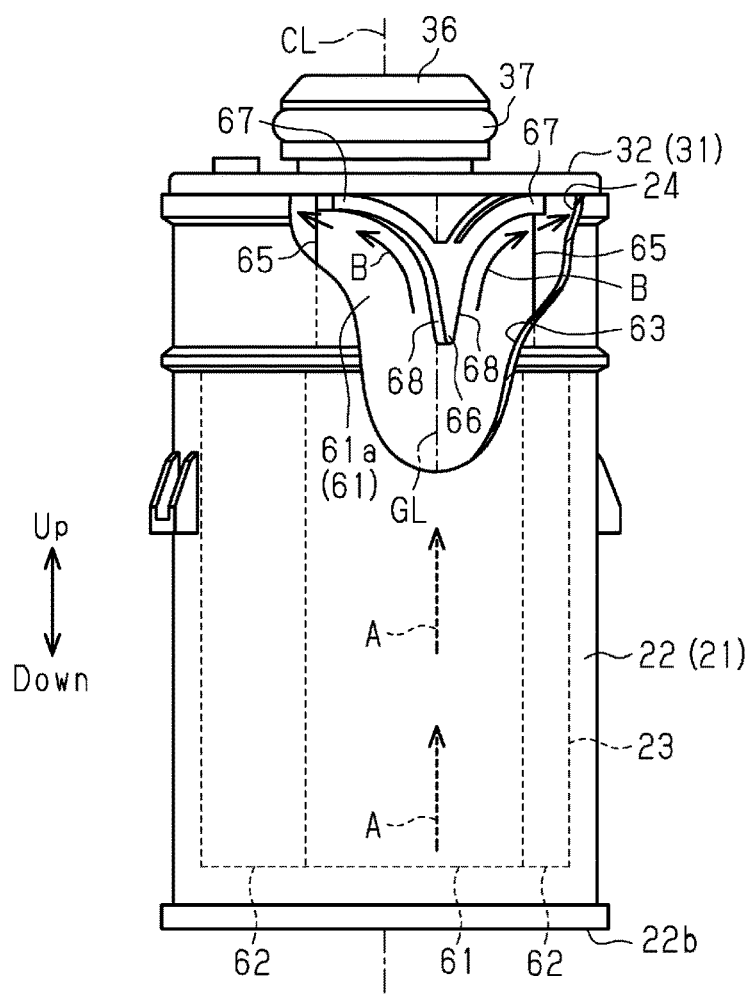
FIG. 3 is a partial side view of a housing with a part cut away and a lid attached to the housing according to the embodiment.

As shown in FIGS. 1 and 3, a cylindrical upper vertical wall 36 protrudes upward from the upper surface of the horizontal wall 32, specifically, from the periphery of the communicating opening 34. The upper end of the upper vertical wall 36 is open. An O-ring 37 is attached to the outer circumference of the upper vertical wall 36.

As shown in FIGS. 1, 8, and 9, the horizontal wall 32 has a substantially cylindrical lower vertical wall 38 on the lower surface. The lower vertical wall 38 protrudes downward from the section surrounding the valve seat 35. The lower vertical wall 38 has a smaller diameter than the tubular portion 23 and is placed inside the tubular portion 23. The lower end of the lower vertical wall 38 is open. The lower vertical wall 38 has windows 39 at positions spaced apart from each other in the circumferential direction. The windows 39 connect, in the radial direction, the space inside the lower vertical wall 38 and the space outside the lower vertical wall 38.

<Connecting Portion 41>

Figure 7:
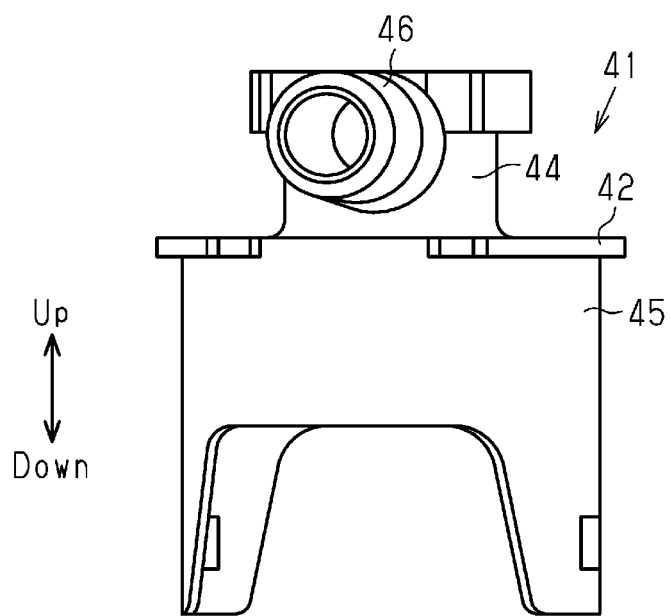
FIG. 7 is a side view of a connecting portion of the embodiment.

As shown in FIGS. 1 and 7, the connecting portion 41 has a horizontal wall 42, a first attaching portion 44, a second attaching portion 45, and a nipple 46. The horizontal wall 42 is substantially disk-shaped and has a circular hole 43 at the central portion. The first attaching portion 44 is cylindrical and protrudes upward from the upper surface of the horizontal wall 42, specifically, from the periphery of the hole 43. The upper end of the first attaching portion 44 is closed. The upper part of the second attaching portion 45 is substantially cylindrical and protrudes downward from the outer periphery of the lower surface of the horizontal wall 42. The lower end of the second attaching portion 45 is open. The nipple 46 extends outward in the radial direction of the first attaching portion 44 from the upper end of the circumferential surface of the first attaching portion 44. The nipple 46 has a cylindrical shape with both ends open.

The connecting portion 41 is attached to the housing 21 and the lid 31 in the following manner. The lower part of the first attaching portion 44 is placed over the upper vertical wall 36 with the O-ring 37 in between. The O-ring 37 ensures the airtightness between the first attaching portion 44 and the upper vertical wall 36. The horizontal wall 42 is placed on the horizontal wall 32, so that the second attaching portion 45 is placed over the upper part of the outer wall 22.

The canister 10 and the fill limit vent valve 20 are connected to each other by a tube 47. One end of the tube 47 is attached to the canister 10, and the other end is fitted over the nipple 46.

The communicating opening 34 of the lid 31 is connected to the canister 10 via the connecting portion 41 and the tube 47.

<Float Valve 51>

As shown in FIG. 1, the float valve 51 includes a float 52 and a valve seat 53. The float valve 51 is accommodated in the tubular portion 23 so as to be movable vertically along the central axis CL of the outer wall 22. The float 52 has an annular recess 54. The annular recess 54 opens in the lower surface of the float 52 and extends upward. The guide tube 26 is inserted into the annular recess 54 from below. The guide tube 26 guides vertical movement of the float 52 by allowing vertical movement of the float 52 while restricting movement in other directions.

The valve seat 53 is attached to the upper end of the float 52 at a position below the valve seat 35. The valve seat 53 may be constituted by a part of the float 52. The float valve 51 is configured to move vertically to close or open the communicating opening 34. That is, the float valve 51 is configured to close the communicating opening 34 when the float 52 moves upward as the level of the liquid fuel rises so that the valve seat 53 contacts the valve seat 35 from below. Also, the float valve 51 is configured to open the communicating opening 34 when the float 52 moves downward as the level of the liquid fuel drops so that the valve seat 53 separates downward from the valve seat 35.

<Spring 55>

The spring 55 is constituted by a coil spring and is arranged inside the annular recess 54 in a state of surrounding the guide tube 26. This arrangement is made with the spring 55 being compressed between the float 52 and the bottom wall 25 so that the urging force is accumulated.

The basic structure of the fill limit vent valve 20 has been described above. Next, characteristic features of the fill limit vent valve 20 of the present embodiment will be described.

As shown in FIGS. 1 to 3, a guide wall 66 is provided between the inlet 64 of the first fuel passage 63 and the discharge ports 65. The guide wall 66 has guide surfaces 68, which change the direction of flow of liquid fuel and fuel vapor. In the present embodiment, the guide wall 66 is provided at the upper end of the first fuel passage 63.

The guide wall 66 includes two branch portions 67, which are adjacent to each other in the circumferential direction of the outer wall 22. A line on the curved surface 61a of the tubular portion 23 that is parallel with the central axis CL of the outer wall 22, in other words, the line of the shortest distance between the upper end and the lower end of the curved surface 61a, will be referred to as a generatrix GL. Each branch portion 67 has one of the guide surfaces 68. The guide surface 68 of each branch portion 67 extends along the curved surface 61a while being inclined relative to the generatrix GL. Each branch portion 67 is curved to bulge upward. The upper end of each branch portion 67, which is the farther end from the adjacent branch portion 67, is located at the upper end of the inner wall 61. The lower end of each branch portion 67 is closer to the adjacent branch portion 67 and located at a section spaced apart downward from the upper end of the inner wall 61 by a predetermined distance. The lower ends of the branch portions 67 are connected to each other.

The two guide surfaces 68 are adjacent to each other in the circumferential direction of the outer wall 22. Like the branch portions 67, the guide surfaces 68 of the branch portions 67 are curved to bulge upward. The guide surfaces 68, which are adjacent to each other, are inclined relative to the generatrix GL as described above, so that the distance between the guide surfaces 68 increases toward the upper side.

The guide wall 66 bridges the outer wall 22 and the inner wall 61. The outer wall 22 and the inner wall 61 are coupled to each other via the guide wall 66.

As shown in FIGS. 2, 8, and 9, two extended guide portions 71 extend downward from the lower surface of the horizontal wall 32 of the lid 31. Specifically, the extended guides 71 extend from sections on opposite sides of the lower vertical wall 38 in the radial direction.

In a state in which the lid 31 is attached to the housing 21, the extended guide portions 71 are placed inside the upper part of the housing 21. Each extended guide portion 71 is curved to bulge outward in the radial direction of the lower vertical wall 38. Each extended guide portion 71 is located at a section adjacent to the guide wall 66 in the circumferential direction of the outer wall 22.

Each extended guide portion 71 has a cutout 72 in the lower part at a position far from the guide wall 66 in the circumferential direction of the outer wall 22.

The space between each extended guide portion 71 and the outer wall 22 constitutes a second fuel passage 73 that extends in the circumferential direction of the outer wall 22 to connect the discharge port 65 of the first fuel passage 63 to the communicating opening 34.

An operation of the above-described embodiment will now be described. Advantages that accompany the operation will also be described.

As shown in FIG. 1, in a normal state, in which the surface of the liquid fuel is not significantly disturbed due to sloshing, when the surface of the liquid fuel is located below the level L1, the weight of the float valve 51 overcomes the urging force of the spring 55, and the valve seat 53 is located below the valve seat 35, so that the communicating opening 34 is opened.

At this time, if liquid fuel remains in the tubular portion 23, the liquid fuel is discharged to the outside of the housing 21 from the communicating hole 27.

The fuel vapor inside the fuel tank 11 flows into the first fuel passage 63 mostly through the inlet 64. The fuel vapor rises within the first fuel passage 63 as indicated by arrows A in FIGS. 1 and 3. When passing the guide wall 66, the fuel vapor flows along the guide surface 68 of each branch portion 67 as indicated by arrows B in FIGS. 2 and 3 to be divided into two flows, which flow in opposite directions along the circumference of the outer wall 22. After being discharged from the discharge port 65 of the first fuel passage 63, the fuel vapor flows through the second fuel passage 73 as indicated by arrows C in FIGS. 2 and 4. After passing the cutout 72 of each extended guide portion 71 as indicated by arrows D in FIGS. 2 and 4, the fuel vapor flows through the window 39 from the space outside the lower vertical wall 38 and enters the space inside the lower vertical wall 38. Thereafter, the fuel vapor flows through the communicating opening 34, the connecting portion 41, and the tube 47 in order to be guided to the canister 10 as indicated by arrows E in FIG. 1. The inflow of the fuel vapor into the canister 10 limits increase in the pressure of the fuel vapor inside the fuel tank 11.

In contrast, when the vehicle travels on a road with irregularities, through a curve, or on an inclined road, the vehicle swings, which may cause the surface of the liquid fuel to be significantly disturbed due to sloshing.

Fuel vapor into which liquid fuel is mixed will hereafter be referred to as air-fuel mixture. The air-fuel mixture flows from the inlet 64 to the first fuel passage 63. The air-fuel mixture rises in the first fuel passage 63 as indicated by arrows A in FIGS. 1 and 3.

If the direction of flow of the air-fuel mixture is not changed by the guide wall 66, the liquid fuel easily flows through the first fuel passage 63, though the resistance to flow of the fuel vapor through the first fuel passage 63 is reduced. This causes the liquid fuel to flow out to the outside of the fuel tank 11.

In contrast, if the direction of flow of the air-fuel mixture is changed, the resistance to flow of the fuel vapor through the first fuel passage 63 is greater than that when the direction of flow is not changed. This increases the pressure of the fuel vapor in the fuel tank 11, hindering entry of liquid fuel into the fuel tank 11.

In particular, in a configuration in which rising fuel vapor is caused to strike the upper wall 86 to change the flow direction to the circumferential direction of the outer wall 87 as in the prior art fill limit vent valve 80, the flow direction is abruptly changed substantially by 90°. Accordingly, the resistance to flow of fuel vapor through the fuel passage 83 is abruptly increased. This abruptly increases the pressure of the fuel vapor in the fuel tank and is thus likely to cause the above-described problems.

However, in the present embodiment, when passing the guide wall 66, the air-fuel mixture flows along the guide surface 68 of each branch portion 67 as indicated by arrows B in FIG. 3 to be divided into two flows. The guide surfaces 68 extend along the curved surface 61*a* while being inclined relative to the generatrix GL of the curved surface 61*a*, such that the distance between the guide surfaces 68 increases toward the upper side. Thus, the air-fuel mixture, which has been divided into two flows, flows along the guide surfaces 68 to flow in directions inclined relative to the generatrix GL. The direction of flow is changed from the direction along the generatrix GL to a direction inclined relative to the generatrix GL. The divided two flows of the air-fuel mixture are separated away from each other toward the upper side. Ultimately, the air-fuel mixture flows in the opposite directions along the circumference of the outer wall 22.

Since the flow of the air-fuel mixture is changed from the upward direction to the circumferential direction of the outer wall 22, the resistance to flow is increased as compared with a case in which the flow direction is not changed. The liquid fuel in the air-fuel mixture is thus more likely to be separated.

After being separated from the fuel vapor, the liquid fuel is discharged from the discharge ports 65 of the first fuel passage 63 and drops into the tubular portion 23 by its own weight.

Figure 4:
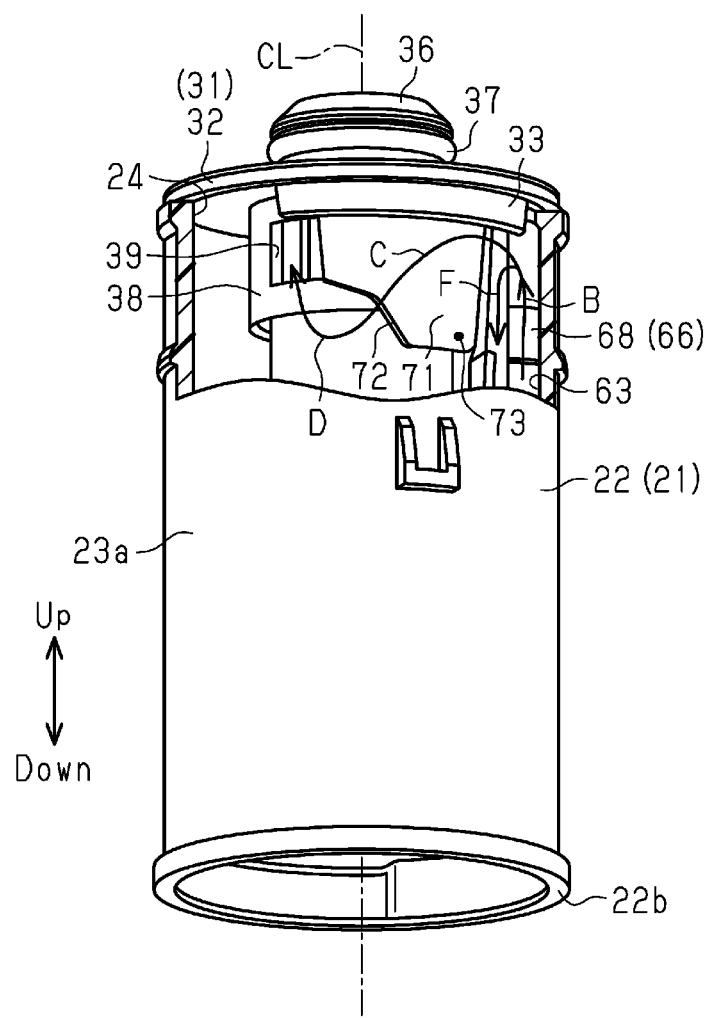
FIG. 4 is a partial perspective view of the housing from diagonally below, in which a part different from the cutaway part in FIG. 3 is cut away and the lid is attached to the housing according to the embodiment.

The air-fuel mixture from which some of the liquid fuel has been separated is discharged from the discharge ports 65 of the first fuel passage 63, and flows through the second fuel passage 73 as indicated by arrows C in FIGS. 2 and 4. The liquid fuel in the air-fuel mixture is separated from the fuel vapor also when the air-fuel mixture flows through the second fuel passage 73 and drops into the tubular portion 23. The air-fuel mixture, in which the amount of liquid fuel has been reduced due to separation, passes the cutout 72 of each extended guide portion 71 and then enters the space inside the lower vertical wall 38 from the space outside the lower vertical wall 38 through the windows 39, as indicated by arrows D in FIGS. 2 and 4. The air-fuel mixture flows through the communicating opening 34, the connecting portion 41, and the tube 47 in order to be guided to the canister 10 as indicated by arrows E in FIG. 1.

This restricts outflow of the liquid fuel to the outside of the fuel tank 11 through the communicating opening 34 together with the fuel vapor. Also, inflow of the air-fuel mixture, in which the amount of liquid fuel has been reduced, into the canister 10 limits increase in the pressure of the fuel vapor in the fuel tank 11.

In the present embodiment, the air-fuel mixture flows along the guide surfaces 68, which are inclined relative to the generatrix GL, as shown in FIG. 3, so that changes in the flow direction are gradual as compared to the case of the prior art fill limit vent valve 80. Thus, with the present embodiment, although the resistance to flow of fuel vapor through the first fuel passage 63 is increased as compared with a configuration in which the flow direction is not changed, the resistance is not increased as abruptly as that in the prior art fill limit vent valve 80. That is, increase in the pressure of the fuel vapor in the fuel tank 11 is limited as compared with the prior art fill limit vent valve 80.

Further, the present embodiment has the second fuel passage 73, which connects the discharge ports 65 of the first fuel passage 63 to the communicating opening 34. This structure guides the air-fuel mixture discharged from the discharge ports 65 to the communicating opening 34. That is, the second fuel passage 73 lengthens the fuel passage as compared with a case in which the second fuel passage 73 is not formed. This increases the amount of liquid fuel separated from fuel vapor. Accordingly, the amount of liquid fuel that reaches the communicating opening 34 through the windows 39 of the lower vertical wall 38 is reduced, so that the outflow of liquid fuel from the fuel tank 11 is limited.

Further, each extended guide portion 71 has a cutout 72 in the lower part at a position far from the guide wall 66 in the circumferential direction in the outer wall 22. This ensures a sufficient length of the extended guide portions 71 in the circumferential direction, that is, a sufficient length of the second fuel passage 73. Liquid fuel in the air-fuel mixture is thus easily separated from fuel vapor. Also, since the fuel vapor is caused to pass the cutouts 72, the fuel vapor easily flows into the windows 39 after flowing along the extended guide portions 71 as compared with a structure in which the cutouts 72 are not formed.

When the surface of the liquid fuel is significantly disturbed due to sloshing as described above, the float valve 51, which is buoyant on the liquid fuel, may move upward as the level of the liquid fuel rises, so that the valve seat 53 closes the communicating opening 34. Also, the urging force of the spring 55 may exceed the weight of the float valve 51 due to the swinging motion of the vehicle, so that the valve seat 53 closes the communicating opening 34. In these cases, the fill limit vent valve 20 is a fuel cut-off valve. Liquid fuel is thus restricted from flowing into the canister 10 via the fill limit vent valve 20.

If the level of the liquid fuel inside the fuel tank 11 is lower than the level L1 during refueling using a fueling nozzle, the surface of the liquid fuel is significantly disturbed due to sloshing. The fuel vapor inside the fuel tank 11 is mixed with the liquid fuel to form air-fuel mixture, which flows into the first fuel passage 63 through the inlet 64 as the level of the liquid fuel rises. Even in this case, the air-fuel mixture passes through the first fuel passage 63 and the second fuel passage 73 as in the case in which the vehicle swings, so that the liquid fuel in the air-fuel mixture is separated from the fuel vapor. The separated liquid fuel drops into the tubular portion 23 by its own weight. This restricts the liquid fuel from flowing out to the outside of the fuel tank 11. Also, since the air-fuel mixture that flows in the first fuel passage 63 flows along the guide surfaces 68, the direction of the flow is changed gradually. This prevents the resistance to flow of fuel vapor through the first fuel passage 63 from being increased and thus maintains the ease of refueling. That is, the present embodiment achieves both separation performance of liquid fuel and fuel vapor in air-fuel mixture and ease of refueling.

When the level of liquid fuel rises to the level L1 during refueling, the liquid fuel closes the inlet 64 to disconnect the interior of the tank 11 from the outside. This causes the liquid fuel to enter the housing 21 due to the difference between the pressure inside the fuel tank 11 and the pressure inside the housing 21. At this time, the liquid fuel also enters the first fuel passage 63. The liquid fuel that has entered the housing 21 raises the float valve 51 to close the communicating opening 34, so that the fill limit vent valve 20 is closed.

The liquid fuel and the fuel vapor rise within the first fuel passage 63 as indicated by arrows A in FIG. 3. When passing the guide wall 66, the liquid fuel and the fuel vapor flow along the guide surface 68 of each branch portion 67 to be divided into two flows represented by arrows B in FIG. 3, which flow in opposite directions along the circumference of the outer wall 22. The liquid fuel is discharged from the discharge ports 65 of the first fuel passage 63 and then drops into the tubular portion 23 by its own weight as indicated by arrow F in FIG. 4. In contrast, after being discharged from the discharge ports 65 of the first fuel passage 63, the fuel vapor flows through the second fuel passage 73 as indicated by arrows C in FIGS. 2 and 4. Then, after passing the cutout 72 of each extended guide portion 71 as indicated by arrows D, the fuel vapor flows through the window 39 from the space outside the lower vertical wall 38 and enters the interior of the lower vertical wall 38.

Along with the rise of the level of the liquid fuel in the tubular portion 23, the float valve 51 rises and the valve seat 53 closes the communicating opening 34, so that ventilation is blocked. This blocking of ventilation instantly increases the pressure of the fuel vapor inside the fuel tank 11. This causes automatic stop of the fueling nozzle and allows the fuel tank 11 to be detected to be full.

The above-described embodiment may be modified as follows. The above-described embodiment and the following modifications can be combined as long as the combined modifications remain technically consistent with each other.

On condition that the first fuel passage 63 includes the guide wall 66, the second fuel passage 73 may be omitted so that the fuel passage is constituted only by the first fuel passage 63.

The guide surface 68 of each branch portion 67 may be constituted by a flat surface instead of a curved surface. Each guide surface 68 may be curved to bulge downward.

Figure 10:
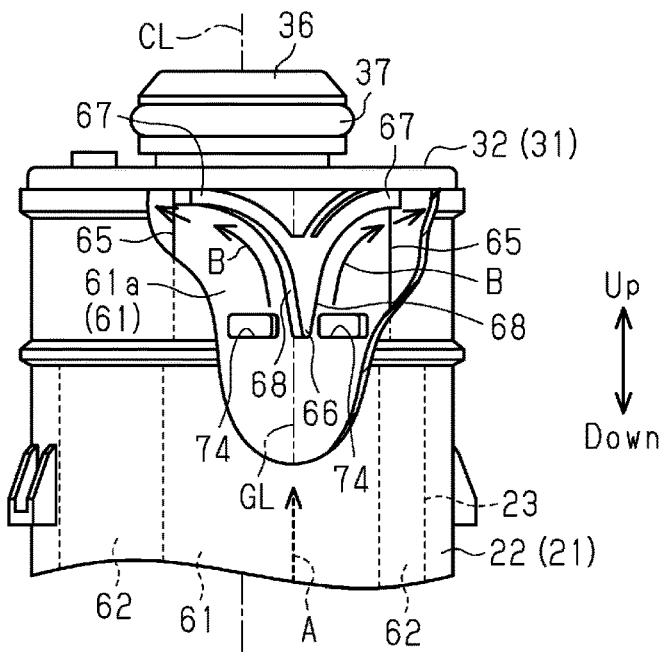
FIG. 10 is a partial side view of a modification in which a tubular portion of a housing has openings, illustrating a housing with a part cut away as in FIG. 3 and a lid attached to the housing.
Figure 11:
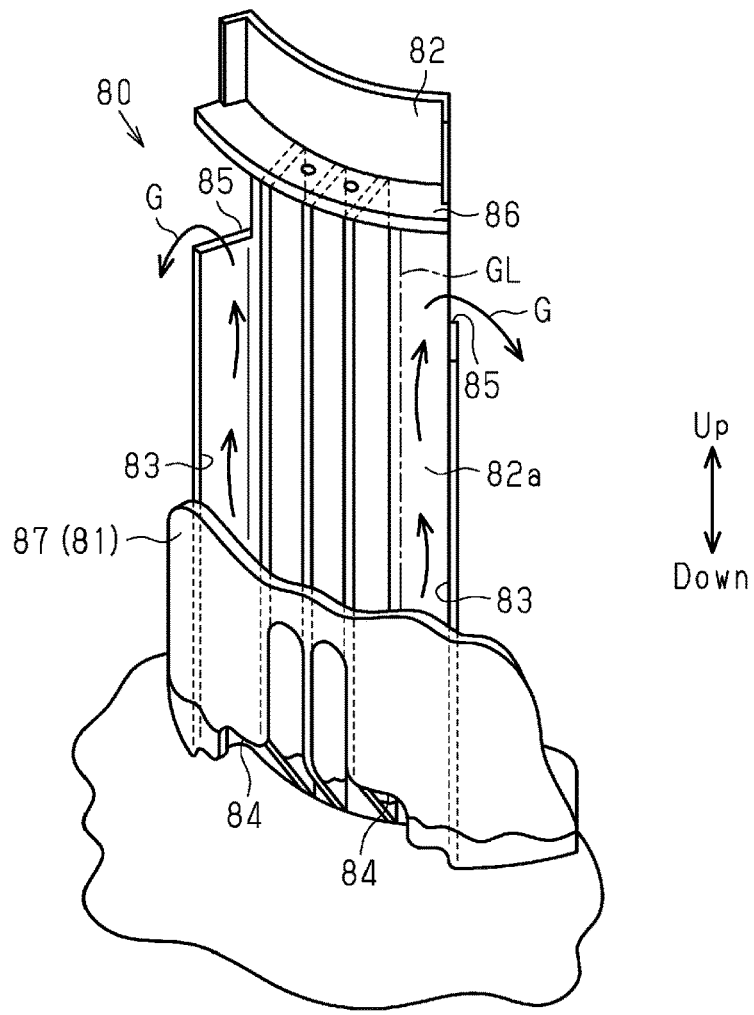
FIG. 11 is a partial perspective view of a prior art fill limit vent valve, illustrating a fuel passage and its surroundings.

As described above, since the first fuel passage 63 includes the guide wall 66, the resistance to flow of the fuel vapor through the first fuel passage 63 is increased to some extent, so that the pressure of the fuel vapor in the fuel tank 11 is increased, as compared to a case in which the guide wall 66 is not provided. To limit pressure increase of the fuel vapor by reducing the resistance, openings 74 may be provided as shown in FIG. 10. The openings 74 are formed in the inner wall 61 of the tubular portion 23 at positions between the inlet 64 and the guide wall 66 to connect the interior of the tubular portion 23 and the outside space.

In this case, the number of the openings 74 may be one or two or more as illustrated in FIG. 10. The shape of the opening 74 may also be changed as necessary. For example, the shape of the opening 74 may be rectangular as illustrated in FIG. 10 or circular. Further, the position of the opening 74 in the inner wall 61 may be lower than the upper end of the inner wall 61 as long as the position is between the inlet 64 and the guide wall 66.

The connecting walls 62 may be omitted from the above-described remainder of the tubular portion 23 so that the remainder is constituted only by the inner wall 61. In this case, the entire part of the tubular portion 23 that faces the first fuel passage 63 will be constituted by the curved surface 61a.

The tubular portion 23 and the outer wall 22 of the housing 21 may be configured as separate components. In this case, the tubular portion 23 and the outer wall 22 both have a tubular shape. The guide wall 66 may be formed on either the inner wall 61 or the outer wall 22 in the tubular portion 23. The tubular portion 23 is arranged in and coupled to the outer wall 22, so that the housing 21 is formed in which the guide wall 66 bridges the tubular portion 23 and the outer wall 22.

One of the two branch portions 67 in the guide wall 66 may be omitted. That is, one of the two guide surfaces 68 in the guide wall 66 may be omitted.

The fill limit vent valve 20 may be attached to the ceiling wall of the fuel tank 11 while being entirely accommodated in the fuel tank 11 as in the above-described embodiment.

The fill limit vent valve 20 may be fixed to the ceiling wall by means such as welding while being inserted through the ceiling wall. In this case, the upper part of the fill limit vent valve 20 is exposed to the outside of the fuel tank 11.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fill limit vent valve comprising:
   a float valve;
   a housing including
      a cylindrical outer wall that constitutes an outer shell of the housing and has a vertically extending central axis, and
      a tubular portion that accommodates the float valve such that the float valve is movable vertically along the central axis; and
      a lid that is placed on an upper end of the tubular portion, wherein
   the lid has a communicating opening that connects a space inside the tubular portion and a space above the lid, wherein
   the housing includes a fuel passage between the tubular portion and the outer wall,
   at least a part of a section of the tubular portion that faces the fuel passage is constituted by a curved surface that bulges toward the fuel passage,
   the fuel passage includes an inlet for liquid fuel and fuel vapor in a fuel tank and a discharge port connected to the communicating opening,
   the discharge port is located above the inlet,
   the fill limit vent valve is configured such that, as a level of liquid fuel that has flowed into the tubular portion through the fuel passage rises, the float valve moves upward and closes the communicating opening to shut off flow of fuel vapor to an outside of the housing,
   a guide wall that has at least one guide surface is provided between the inlet and the discharge port of the fuel passage,
   the at least one guide surface is configured to change a direction of flow of the liquid fuel and the fuel vapor,
   a straight line on the curved surface that is parallel with the central axis is defined as a generatrix,
   the at least one guide surface extends along the curved surface while being inclined relative to the generatrix,
   the at least one guide surface is two guide surfaces that are adjacent to each other in a circumferential direction of the outer wall,
   the guide surfaces are inclined relative to the generatrix such that a distance between the guide surfaces increases toward an upper side,
   the guide wall includes two branch portions, which are adjacent to each other in the circumferential direction of the outer wall, and
   each of the two branch portions includes a corresponding one of the two guide surfaces.

2. The fill limit vent valve according to claim 1, wherein each guide surface is curved to bulge upward.

3. The fill limit vent valve according to claim 1, wherein the tubular portion includes an opening between the inlet and the guide wall, and
   the opening connects the space inside the tubular portion and the fuel passage to each other.

4. The fill limit vent valve according to claim 1, wherein the fuel passage is a first fuel passage,
   the lid includes an extended guide portion that is placed inside the housing,
   a second fuel passage is formed between the outer wall and the extended guide portion, and
   the second fuel passage extends in the circumferential direction of the outer wall and connects the discharge port of the first fuel passage and the communicating opening to each other.

5. The fill limit vent valve according to claim 4, wherein the extended guide portion is located at a section adjacent to the guide wall in the circumferential direction of the outer wall.

* * * * *